United States Patent
Kawabe et al.

(10) Patent No.: US 9,824,707 B2
(45) Date of Patent: Nov. 21, 2017

(54) DISK APPARATUS, DRIVER CIRCUIT, AND CONTROL METHOD

(71) Applicant: Kabushiki Kaisha Toshiba, Minato-ku, Tokyo (JP)

(72) Inventors: Takayuki Kawabe, Sagamihara Kanagawa (JP); Takuji Matsuzawa, Kashiwa Chiba (JP); Takeyori Hara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/065,576

(22) Filed: Mar. 9, 2016

(65) Prior Publication Data

US 2017/0169844 A1    Jun. 15, 2017

Related U.S. Application Data

(60) Provisional application No. 62/267,484, filed on Dec. 15, 2015.

(51) Int. Cl.
*G11B 21/02* (2006.01)
*G11B 5/55* (2006.01)
*G11B 20/10* (2006.01)
*G11B 5/48* (2006.01)

(52) U.S. Cl.
CPC .......... *G11B 5/5552* (2013.01); *G11B 5/4813* (2013.01); *G11B 20/10* (2013.01)

(58) Field of Classification Search
None
See application file for complete search history.

(56) References Cited

U.S. PATENT DOCUMENTS

| | | | |
|---|---|---|---|
| 5,901,010 A * | 5/1999 | Glover | G11B 5/588 360/294.5 |
| 5,920,441 A * | 7/1999 | Cunningham | G11B 5/5552 360/78.03 |
| 6,542,326 B1 * | 4/2003 | Ell | G11B 5/5552 360/78.05 |
| 6,624,982 B2 * | 9/2003 | Masuda | G11B 5/5556 360/294.4 |
| 6,972,924 B1 * | 12/2005 | Chen | G11B 5/4813 360/294.4 |
| 7,027,253 B1 | 4/2006 | Sun et al. | |
| 7,773,345 B2 | 8/2010 | Hayashi et al. | |

(Continued)

FOREIGN PATENT DOCUMENTS

| | | |
|---|---|---|
| JP | 2001-266517 A | 9/2001 |
| JP | 2008-004142 A | 1/2008 |
| JP | 2011-123960 A | 6/2011 |

*Primary Examiner* — K. Wong
(74) *Attorney, Agent, or Firm* — White & Case LLP

(57) ABSTRACT

According to one embodiment, there is provided a disk apparatus including a first disk, a second disk, a main actuator, a first actuator, a second actuator, a third actuator, and a driver circuit. The driver circuit is configured to be able to switch between a first mode and a second mode. The first mode is a mode where a first actuator, a second actuator, and a third actuator are driven in a same direction. The second mode is a mode where the first actuator and the second actuator are driven in opposite directions and where the third actuator and the second actuator are driven in opposite directions.

20 Claims, 13 Drawing Sheets

(56) References Cited

U.S. PATENT DOCUMENTS

| | | | | |
|---|---|---|---|---|
| 8,699,166 B2* | 4/2014 | Suzuki | ................ | G11B 5/4813 360/55 |
| 9,230,583 B1* | 1/2016 | Nojima | ................ | G11B 5/596 |
| 2011/0013319 A1 | 1/2011 | Soga et al. | | |

* cited by examiner

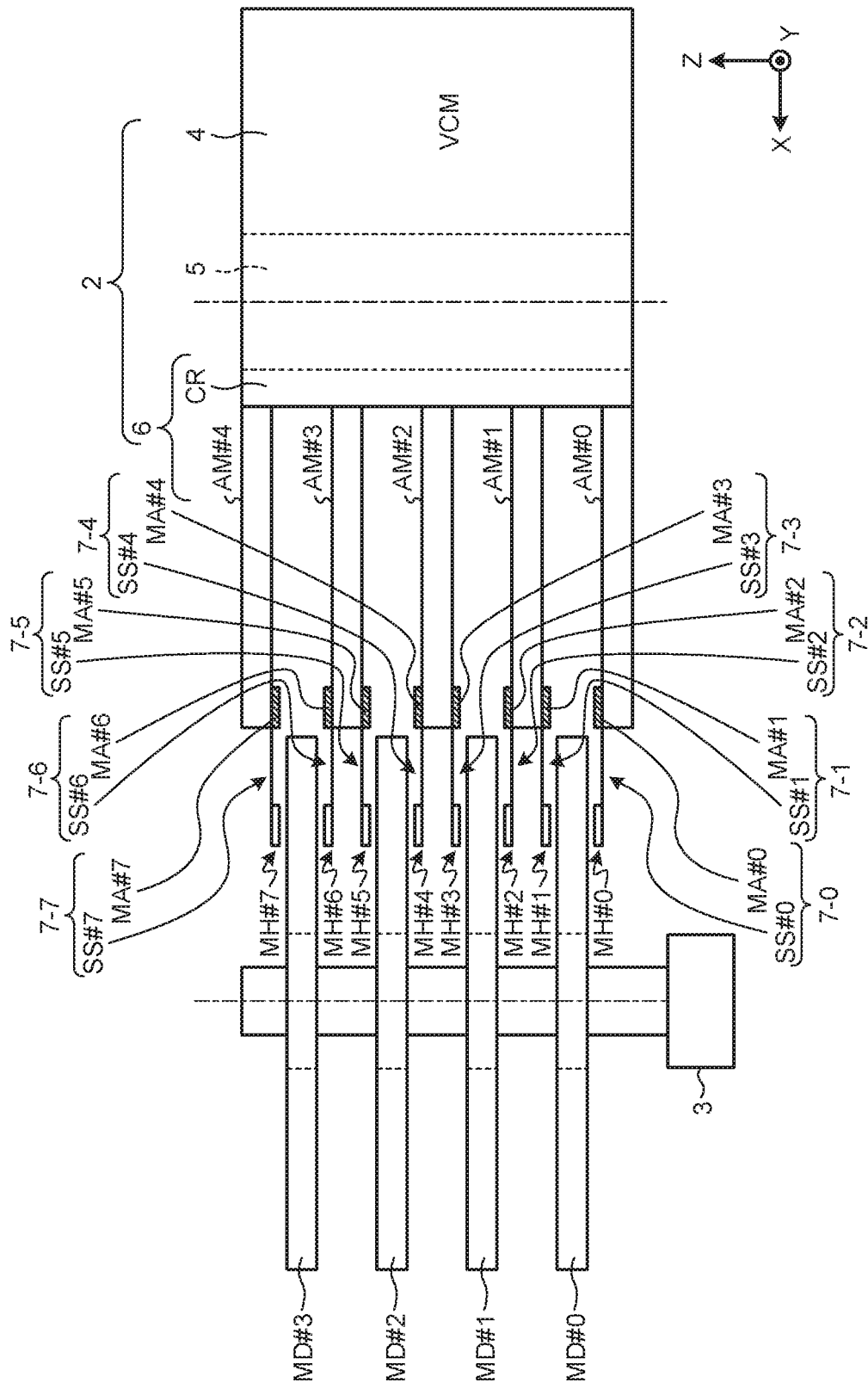

FIG.6

| ACTIVE MH# | POLE | V0A | V0B | V1A | V1B | Mode |
|---|---|---|---|---|---|---|
| 0 | L | MADRV | GND | MADRV | GND | InPhase |
| 1 | H | MADRV | GND | -MADRV | GND | Scissors |
| 2 | H | MADRV | GND | -MADRV | GND | Scissors |
| 3 | H | MADRV | GND | -MADRV | GND | Scissors |
| 4 | H | MADRV | GND | -MADRV | GND | Scissors |
| 5 | H | MADRV | GND | -MADRV | GND | Scissors |
| 6 | H | MADRV | GND | -MADRV | GND | Scissors |
| 7 | L | MADRV | GND | MADRV | GND | InPhase |

FIG.10

| STATE | ACTIVE MH# | POLE#0 | POLE#1 | MA#0 | MA#1 | MA#2 | MA#3 | MA#4 | MA#5 | MA#6 | MA#7 | Mode |
|---|---|---|---|---|---|---|---|---|---|---|---|---|
| ST1 | 0 or 7 | H | H | + | + | + | + | + | + | + | + | InPhase |
| ST2 | 0 or 7 | L | L | - | - | - | - | - | - | - | - | InPhase |
| ST3 | 1-6 | H | L | + | - | + | - | + | - | + | - | Scissors |
| ST4 | 1-6 | L | H | - | + | - | + | - | + | - | + | Scissors |

FIG.11

| ACTIVE MH# | PREV. STATE | ST1 | ST2 | ST3 | ST4 |
|---|---|---|---|---|---|
| 0 | STATE | ST1 | ST2 | ST1 | ST2 |
| 1 | | ST4 | ST3 | ST3 | ST4 |
| 2 | | ST3 | ST4 | ST3 | ST4 |
| 3 | | ST4 | ST3 | ST3 | ST4 |
| 4 | | ST3 | ST4 | ST3 | ST4 |
| 5 | | ST4 | ST3 | ST3 | ST4 |
| 6 | | ST3 | ST4 | ST3 | ST4 |
| 7 | | ST1 | ST2 | ST2 | ST1 |

DISK APPARATUS, DRIVER CIRCUIT, AND CONTROL METHOD

CROSS-REFERENCE TO RELATED APPLICATIONS

This application is based upon and claims the benefit of priority from U.S. Provisional Application No. 62/267,484, filed on Dec. 15, 2015; the entire contents of which are incorporated herein by reference.

FIELD

Embodiments described herein relate generally to a disk apparatus, a driver circuit, and a control method.

BACKGROUND

In disk apparatuses, a dual stage actuator (DSA) technique that drives a head by a coarse movement actuator and a fine movement actuator, may be adopted. In this case, it is desired to improve accuracy in positioning the head relative to a disk.

BRIEF DESCRIPTION OF THE DRAWINGS

FIG. 2 is a side view showing a configuration of a coarse movement actuator, fine movement actuators, and heads in the first embodiment;

FIG. 6 is a state diagram showing an operation of a driver in the first embodiment;

FIG. 10 is a state diagram showing an operation of a driver in the second embodiment;

FIG. 11 is a state transition diagram of the driver in the second embodiment;

DETAILED DESCRIPTION

In general, according to one embodiment, there is provided a disk apparatus including a first disk, a second disk, a main actuator, a first actuator, a second actuator, a third actuator, and a driver circuit. The first disk has a first recording surface and a second recording surface. The second disk has a third recording surface. The main actuator has a first arm and a second arm. The first actuator is supported by the first arm to move a first head relative to the first recording surface of the first disk. The second actuator is placed adjacent to the first actuator along a direction substantially perpendicular to the first recording surface. The second actuator is supported by the second arm to move a second head relative to the second recording surface of the first disk. The third actuator is placed adjacent to the second actuator and on an opposite side from the first actuator along the direction substantially perpendicular to the first recording surface. The third actuator is supported by the second arm to move a third head relative to the third recording surface of the second disk. The driver circuit is configured to be able to switch between a first mode and a second mode. The first mode is a mode where the first actuator, the second actuator, and the third actuator are driven in a same direction. The second mode is a mode where the first actuator and the second actuator are driven in opposite directions and where the third actuator and the second actuator are driven in opposite directions.

Exemplary embodiments of a disk apparatus, a driver circuit, and a control method will be explained below in detail with reference to the accompanying drawings. The present invention is not limited to the following embodiments.

(First Embodiment)

A disk apparatus 100 according to the first embodiment will be described. In disk apparatuses, a dual stage actuator (DSA) technique that drives a head by a coarse movement actuator and a fine movement actuator, may be adopted.

Figure 1:
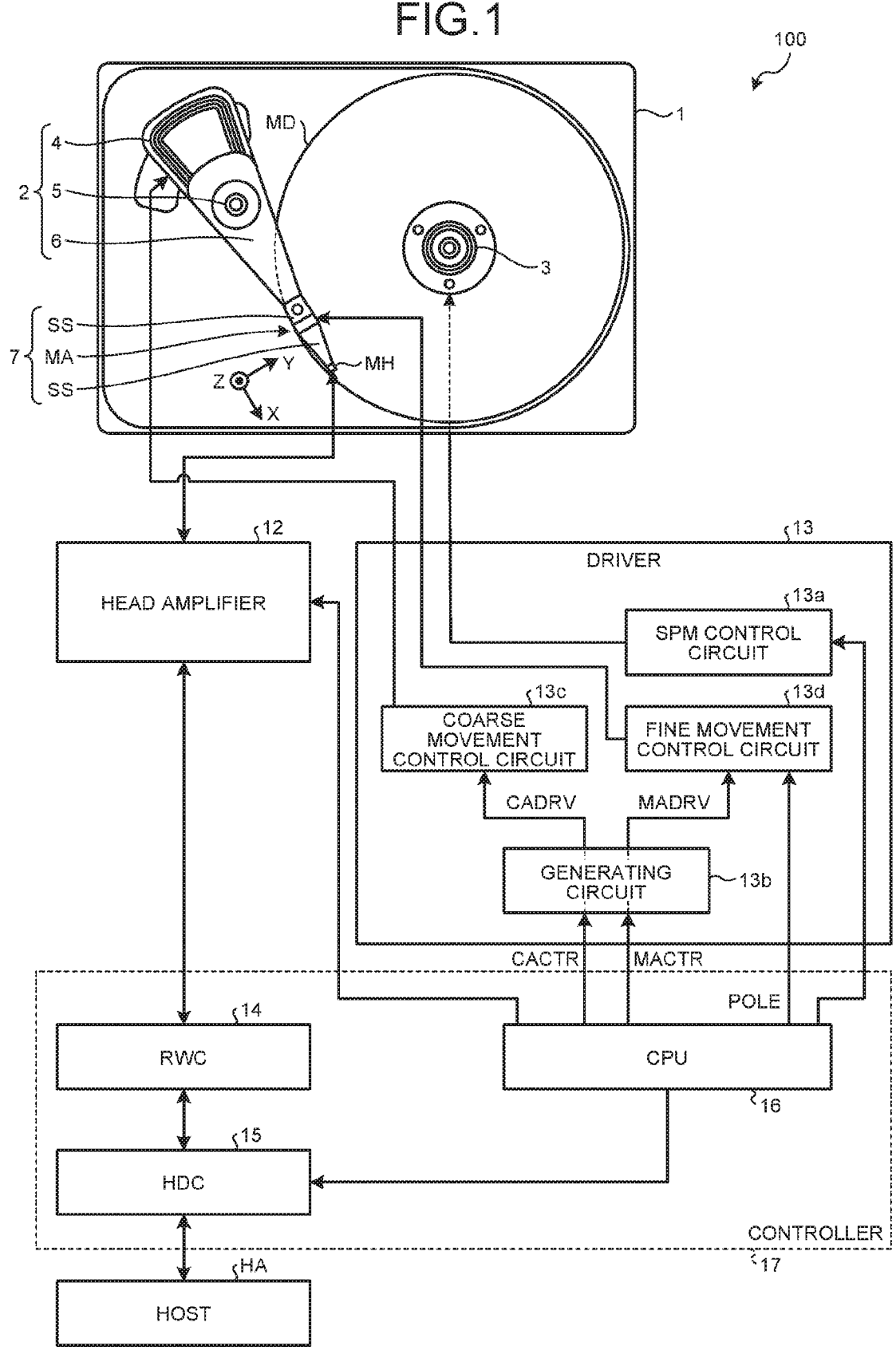
FIG. 1 is a diagram showing a configuration of a disk apparatus according to a first embodiment.

For example, the disk apparatus 100 includes an enclosure 1, multiple magnetic disks MD, a spindle motor (SPM) 3, a coarse movement actuator 2, multiple fine movement actuators 7, multiple magnetic heads MH, a head amplifier 12, a read write channel (RWC) 14, a hard disk controller (HDC) 15, a processor (CPU) 16, and a driver circuit 13 as shown in FIG. 1. FIG. 1 is a diagram showing schematically a configuration of the disk apparatus 100.

The multiple magnetic disks MD are rotatably supported via the SPM 3 in the enclosure 1. The SPM 3 is rotationally driven by the driver circuit 13. The multiple magnetic heads MH are provided corresponding to front sides (recording surfaces) and back sides (recording surfaces) of the multiple magnetic disks MD. Each magnetic head MH is placed opposite to the front side or back side of a magnetic disk MD.

The magnetic heads MH move over the magnetic disks MD via the coarse movement actuator 2 and the fine movement actuators 7. The coarse movement actuator 2 and the fine movement actuators 7 are driven by the driver circuit 13. The coarse movement actuator 2 includes a voice coil motor (VCM) 4, a rotation shaft 5, and a carriage arm 6. The VCM 4 includes a magnet and a voice coil and functions as a movable element in the coarse movement actuator 2. The magnet is secured to the enclosure 1. The coarse movement actuator 2 coarsely moves the carriage arm 6, the fine movement actuators 7, and the magnetic heads MH by a force electromagnetically exerted by the magnet and voice coil. The fine movement actuator 7 includes a suspension SS and a stretchable member MA. The suspension SS holds the magnetic head MH. The stretchable member MA includes a piezoelectric element and functions as a movable element in the fine movement actuator 7. The fine movement actuator 7 finely moves the magnetic head MH by a force mechanically exerted on the suspension SS from the stretchable member MA.

The magnetic head MH includes a write head used to write data onto the magnetic disk MD and a read head used to read data from the magnetic disk MD.

The head amplifier 12 supplies write signal (current) according to write data input from the RWC 14 to the magnetic head MH (the write head). Further, the head amplifier 12 amplifies the read signal output from the magnetic head MH (the read head) to transmit to the RWC 14. The head amplifier 12 can be constituted by a one-chip integrated circuit. The package of the head amplifier 12 may be mounted on the side surface of the carriage arm 6.

The RWC 14 is a signal processing circuit. The RWC 14 encodes (code modulates) write data input from the HDC 15 to output to the head amplifier 12. Further, the RWC 14 decodes (code demodulates) the read signal transmitted from the head amplifier 12 into read data to output to the HDC 15.

The HDC 15 performs control of transmission/reception of data to/from the host HA via an I/F bus, and so on. The HDC 15 includes a host interface (host I/F) circuit (not shown).

The CPU 16 controls the disk apparatus 100 overall according to firmware stored in a nonvolatile memory (not shown) or a magnetic disk MD. For example, the CPU 16 performs various control processes such as a read or write control process with a magnetic head MH and a servo control process of controlling the position of a magnetic head MH over a recording surface of a magnetic disk MD. The firmware includes initial firmware to be executed first at the startup of the disk apparatus 100 and for-control firmware used for usual operation of the disk apparatus 100.

Note that the hardware configuration including the RWC 14, HDC 15, and CPU 16 may be regarded as a controller 17. The controller 17 can be constituted by a one-chip integrated circuit (system-on-chip). The package of the controller 17 may be placed on a printed-circuit board outside the enclosure 1.

The driver circuit 13 drives the SPM 3, the coarse movement actuator 2, and the fine movement actuators 7 according to control by the controller 17 (CPU 16). The driver circuit 13 can be constituted by a one-chip integrated circuit. The package of the driver circuit 13 may be placed on the printed-circuit board outside the enclosure 1.

The driver circuit 13 has a SPM control circuit 13a, a generating circuit 13b, a coarse movement control circuit 13c, and a fine movement control circuit 13d. The SPM control circuit 13a generates a drive signal (drive voltage or drive current) according to a control signal received from the CPU 16 to supply to the SPM 3. By this means, the SPM 3 rotationally drives the multiple magnetic disks MD.

The generating circuit 13b receives a control signal CACTR related to the coarse movement control position of the magnetic heads MH from the CPU 16. The generating circuit 13b generates a coarse movement control signal CADRV based on the control signal CACTR to supply to the coarse movement control circuit 13c. Further, the generating circuit 13b receives a control signal MACTR related to the fine movement control position of the magnetic heads MH from the CPU 16. The generating circuit 13b generates a fine movement control signal MADRV based on the control signal MACTR to supply to the fine movement control circuit 13d.

The coarse movement control circuit 13c generates a drive signal (drive voltage or drive current) according to the coarse movement control signal CADRV to supply to the coarse movement actuator 2 (VCM 4). With this arrangement, the coarse movement actuator 2 (VCM 4) coarsely moves the magnetic heads MH.

The fine movement control circuit 13d generates drive signals (drive voltages or drive currents) according to the fine movement control signal MADRV to supply to the fine movement actuators 7 (the stretchable members MA). With this arrangement, the fine movement actuators 7 (the stretchable members MA) finely move the magnetic heads MH.

That is, the CPU 16 controls the driver circuit 13 so as to position the magnetic head MH in two stages of coarse movement by the coarse movement actuator 2 and fine movement by the fine movement actuator 7.

Next, the configuration of the coarse movement actuator 2, the fine movement actuators 7, and the magnetic heads MH will be described in more detail using FIG. 2. FIG. 2 is a side view showing the configuration of the coarse movement actuator 2, the fine movement actuators 7, and the magnetic heads MH. In FIG. 2, let a Z direction be a direction along the rotation shaft 5, an X direction be a direction from the rotation shaft 5 to the magnetic head MH, and a Y direction be a direction substantially orthogonal to the Z and X directions. The Y direction is a direction along the diameter of the magnetic disk MD (see FIG. 1). The Z direction is a direction substantially perpendicular to the recording surface (front side or back side) of the magnetic disk MD. FIG. 2 illustrates the configuration where the number of magnetic disks MD is four, the number of magnetic heads MH is eight, and the number of arms AM is five.

The carriage arm 6 of the coarse movement actuator 2 has a carriage CR mechanically linked to the VCM 4 and multiple arms AM#0 to AM#4 extending from the carriage CR. The VCM 4 is placed on the −X side of the rotation shaft 5, and the carriage CR is placed on the +X side of the rotation shaft 5. Each arm AM#0 to AM#4 extends in the +X direction. The arms AM#0, AM#4 are the outermost from among the multiple arms AM#0 to AM#4.

Multiple fine movement actuators 7-0 to 7-7 are mounted on the coarse movement actuator 2.

For example, the fine movement actuator 7-0 is supported by the arm AM#0 at the +Z side and moves the magnetic head MH#0 in the ±Y direction (diameter directions of the magnetic disk MD shown in FIG. 1) with respect to the −Z side recording surface of the magnetic disk MD#0. In the fine movement actuator 7-0, the suspension SS#0 is mounted on the +Z side surface of the arm AM#0, and the stretchable member MA#0 is mounted on the suspension SS#0. The fine movement actuator 7-0 finely moves the magnetic head MH#0 using a force mechanically exerted on the suspension SS#0 from the stretchable member MA#0.

The fine movement actuator 7-1 is supported by the arm AM#1 at the −Z side and moves the magnetic head MH#1 in the ±Y direction (diameter directions of the magnetic disk MD shown in FIG. 1) with respect to the +Z side recording surface of the magnetic disk MD#0. In the fine movement actuator 7-1, the suspension SS#1 is mounted on the −Z side surface of the arm AM#1, and the stretchable member MA#1 is mounted on the suspension SS#1. The fine movement actuator 7-1 finely moves the magnetic head MH#1 using a force mechanically exerted on the suspension SS#1 from the stretchable member MA#1. Note that the fine movement actuators 7-3, 7-5, 7-7 have similar configuration to the fine movement actuator 7-1.

The fine movement actuator 7-2 is supported by the arm AM#1 at the +Z side and moves the magnetic head MH#2 in the ±Y direction (diameter directions of the magnetic disk MD shown in FIG. 1) with respect to the −Z side recording surface of the magnetic disk MD#1. In the fine movement actuator 7-2, the suspension SS#2 is mounted on the +Z side surface of the arm AM#1, and the stretchable member MA#2 is mounted on the suspension SS#2. The fine movement actuator 7-2 finely moves the magnetic head MH#2 using a force mechanically exerted on the suspension SS#2 from the stretchable member MA#2. The fine movement actuators 7-4, 7-6 have similar configuration to the fine movement actuator 7-2.

Figure 3A:
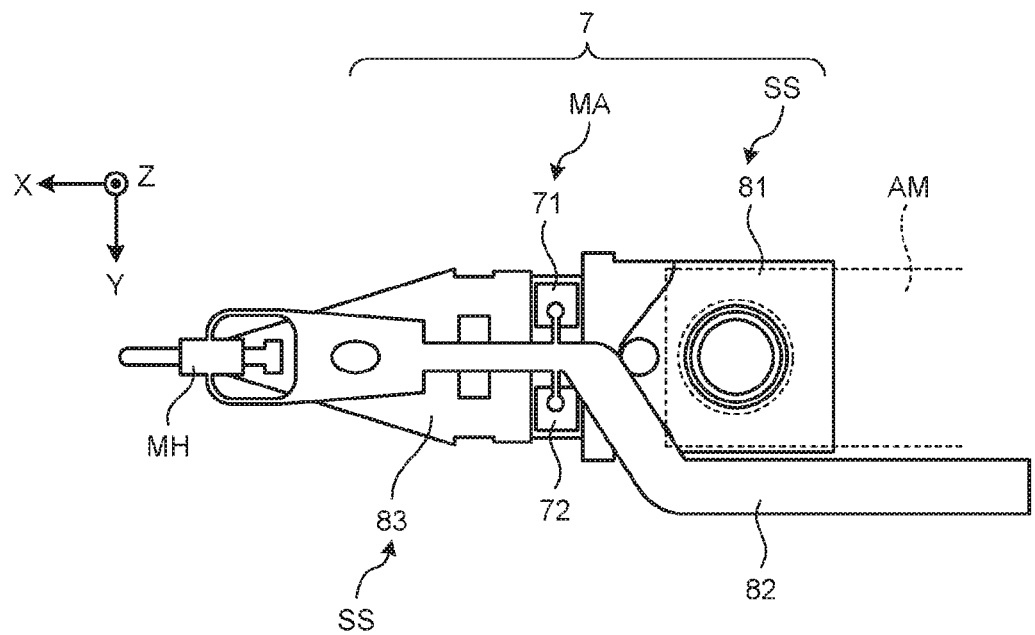
FIG. 3A is a plane view showing an example configuration of a fine movement actuator and a head in the first embodiment.

Although FIG. 2 shows schematically the placement positions of the stretchable members MA (MA#0 to MA#7), a specific way that the stretchable member MA is mounted is shown in, e.g., FIG. 3A. FIG. 3A is a plane view showing an example configuration of the fine movement actuator 7 and the magnetic head MH. The stretchable member MA includes a first member 71 and a second member 72. The suspension SS has a base plate 81, a flexure 82, and a load beam 83. The first member 71 and the second member 72 are placed between the base plate 81 and the load beam 83. The first member 71 and the second member 72 are placed on opposite sides of the flexure 82.

Figure 3B:
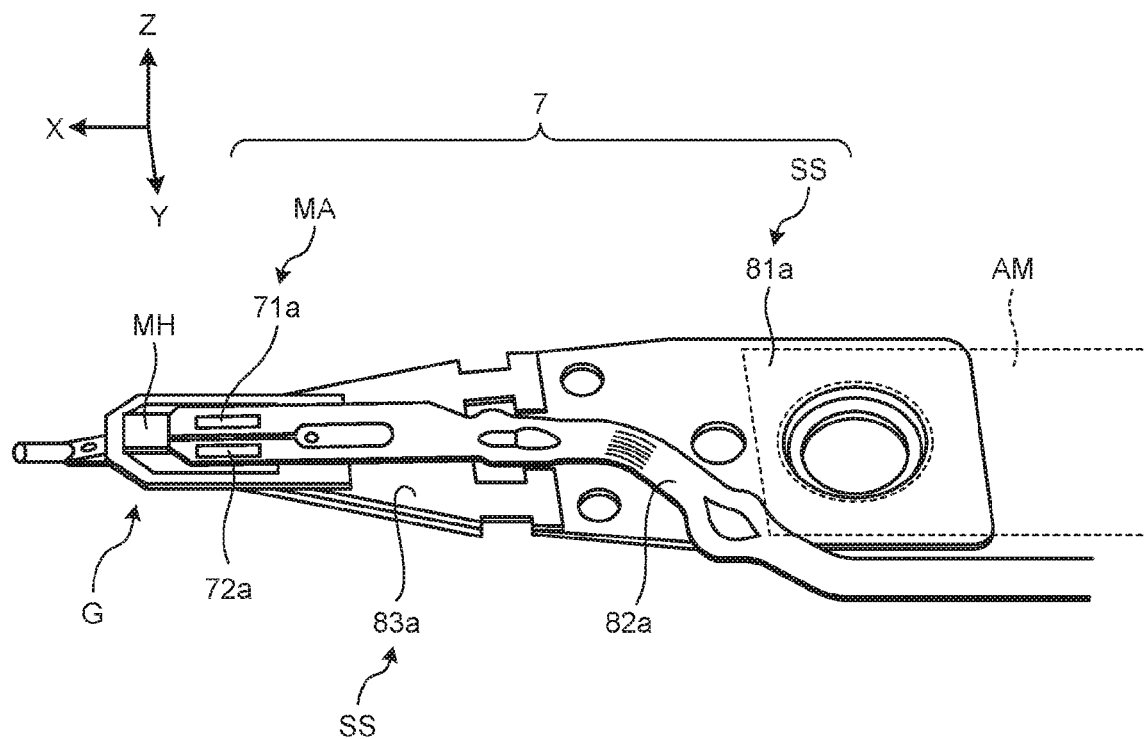
FIG. 3B is a perspective view showing another example configuration of a fine movement actuator and a head in the first embodiment.

Or the stretchable member MA is mounted in a specific way as shown in, e.g., FIG. 3B. FIG. 3B is a perspective view showing another example configuration of a fine movement actuator 7 and the magnetic head MH. The stretchable member MA has a first member 71a and a second member 72a. The suspension SS includes a base plate 81a, a flexure 82a, and a load beam 83a. The first member 71a and the second member 72a are placed between the magnetic head MH and the load beam 83a on a gimbal portion G at the tip of the flexure 82a. The first member 71a and the second member 72a are placed on opposite sides of a center of the flexure 82a.

Here, the individual fine movement actuator 7 shown in FIG. 3A or 3B finely moves the magnetic head MH in the following way. In the fine movement actuator 7, the first member 71, 71a and the second member 72, 72a each receive a drive signal (drive voltage) from the driver circuit 13 via the flexure 82, 82a to generate a mechanical force. For example, by the first member 71, 71a stretching in the X direction (generating a force in the +X direction) while the second member 72, 72a contracts in the X direction (generating a force in the −X direction), the stretchable member MA of the fine movement actuator 7 finely moves the magnetic head MH in the +Y direction. By the first member 71, 71a contracting in the X direction (generating a force in the −X direction) while the second member 72, 72a stretches in the X direction (generating a force in the +X direction), the stretchable member MA of the fine movement actuator 7 finely moves the magnetic head MH in the −Y direction.

Figure 4A:
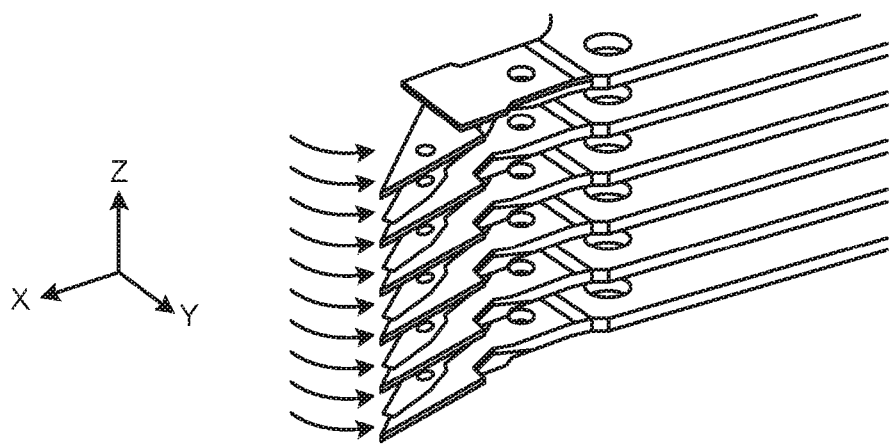
FIG. 4A is a perspective view showing an operation of the fine movement actuators and the heads in the first embodiment.

Here, as to the driving of the multiple fine movement actuators 7-0 to 7-7 in the disk apparatus 100, control (first control) to drive the multiple fine movement actuators 7-0 to 7-7 in the same direction is possible. In the first control, because the fine movement actuators 7-0 to 7-7 are driven in the same direction, all the magnetic heads MH#0 to MH#7 connected to the coarse movement actuator 2 are finely moved in the same direction as shown in FIG. 4A. FIG. 4A is a perspective view showing an operation of the fine movement actuators 7-0 to 7-7 and the magnetic heads MH#0 to MH#7. FIG. 4A illustrates the case where the fine movement actuators 7-0 to 7-7 finely move the magnetic heads MH#0 to MH#7 in the +Y direction. If the fine movement actuators 7-0 to 7-7 are driven in the same direction so that all the magnetic heads MH#0 to MH#7 are finely moved in the same direction simultaneously, its reaction force excites the bending mode of the carriage arm 6, so that it may become difficult to raise the control band.

Figure 4B:
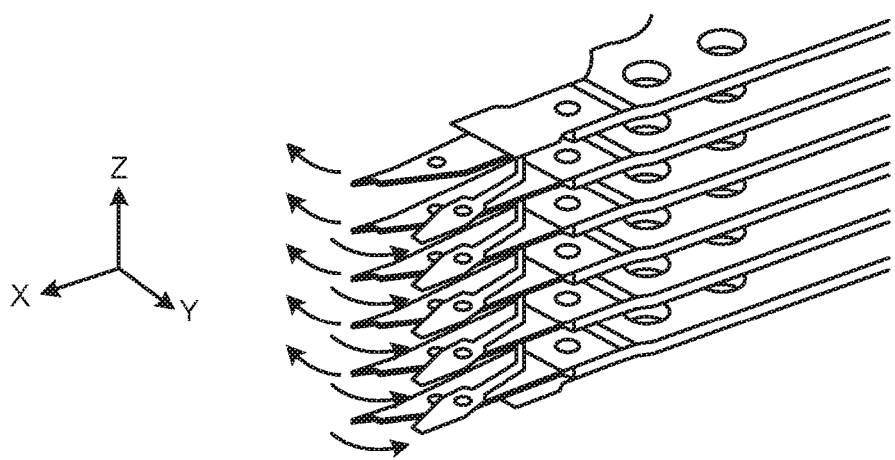
FIG. 4B is a perspective view showing an operation of the fine movement actuators and the heads in the first embodiment.
Figure 4C:
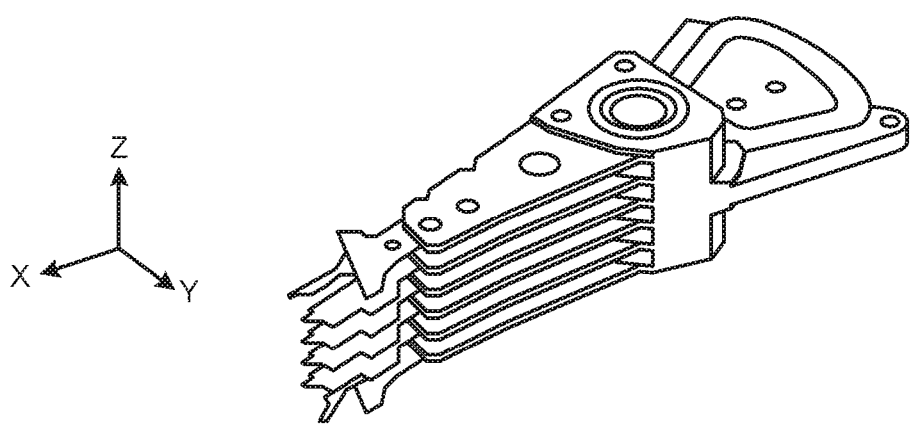
FIG. 4C is a perspective view showing an operation of the coarse movement actuator, the fine movement actuators, and the heads in the first embodiment.

In contrast, as to the driving of the multiple fine movement actuators 7-0 to 7-7 in the disk apparatus 100, control (second control) to drive fine movement actuators adjacent along the Z direction in opposite directions is possible. In the second control, because ones adjacent along the Z direction of the fine movement actuators 7-0 to 7-7 are driven in opposite directions, ones adjacent along the Z direction of all the magnetic heads MH#0 to MH#7 connected to the coarse movement actuator 2 are finely moved in opposite directions as shown in FIG. 4B. FIG. 4B is a perspective view showing an operation of the fine movement actuators 7-0 to 7-7 and the magnetic heads MH. For example, reaction forces exerted on arms AM#1 to AM#3 (see FIG. 2) of the carriage arm 6 from fine movement actuators 7-1 and 7-2, 7-3 and 7-4, 7-5 and 7-6 attached to the same arms and adjacent along the Z direction, from among the fine movement actuators 7-0 to 7-7, can cancel out, and hence the bending mode of the carriage arm 6 can be suppressed, so that it becomes easy to raise the control band.

However, among stresses (reaction forces) imposed on the carriage arm 6, there is a torsional mode as well as the bending mode. In the second control, for the outermost arm AM#0, AM#4 of the arms AM#0 to AM#4 of the carriage arm 6, such a fine movement actuator 7 does not exist that their reaction forces cancel out (see FIG. 2). Thus, while the magnetic head MH#0, MH#7 is being finely moved, the torsional mode of arm AM#0, AM#4 due to a reaction force exerted on arm AM#0, AM#4 from the fine movement actuator 7-0, 7-7 is not canceled out. When improvement of the control band is considered, the difficulty in raising the control band due to the torsional mode excited in the second control is considered to be more conspicuous than the difficulty in raising it due to the bending mode excited in the first control.

Accordingly, in the present embodiment, by switching the drive mode of the fine movement actuators 7-0 to 7-7 between an InPhase mode where they are driven in the same direction and a Scissors mode where fine movement actuators 7 adjacent along the Z direction are driven in opposite directions depending on the magnetic head MH to be used in access processing, efficient improvement of the control band is achieved. Hereinafter, a magnetic head MH used in access processing for recording/reproducing data onto/from the magnetic disk MD may be called an active magnetic head MH.

Specifically, when access processing (recording/reproducing) is performed by the inner magnetic heads MH#1 to MH#6, with which the cancelling-out effect for the torsional mode and bending mode of the carriage arm 6 is high, the stretchable members MA#0 to MA#7 (see FIG. 2) are driven in the Scissors mode. When access processing (recording/reproducing) is performed by the outer magnetic heads MH#0, MH#7, with which the excitation of the torsional mode of the carriage arm by Scissors-mode driving is conspicuous, the stretchable members MA#0 to MA#7 are driven in the InPhase mode. Hence, the fine movement control circuit 13d of the driver circuit 13 that drives the stretchable members MA is configured such that the drive mode of the stretchable members MA#0 to MA#7 (see FIG. 2) can be switched between the InPhase mode and the Scissors mode.

Figure 5:
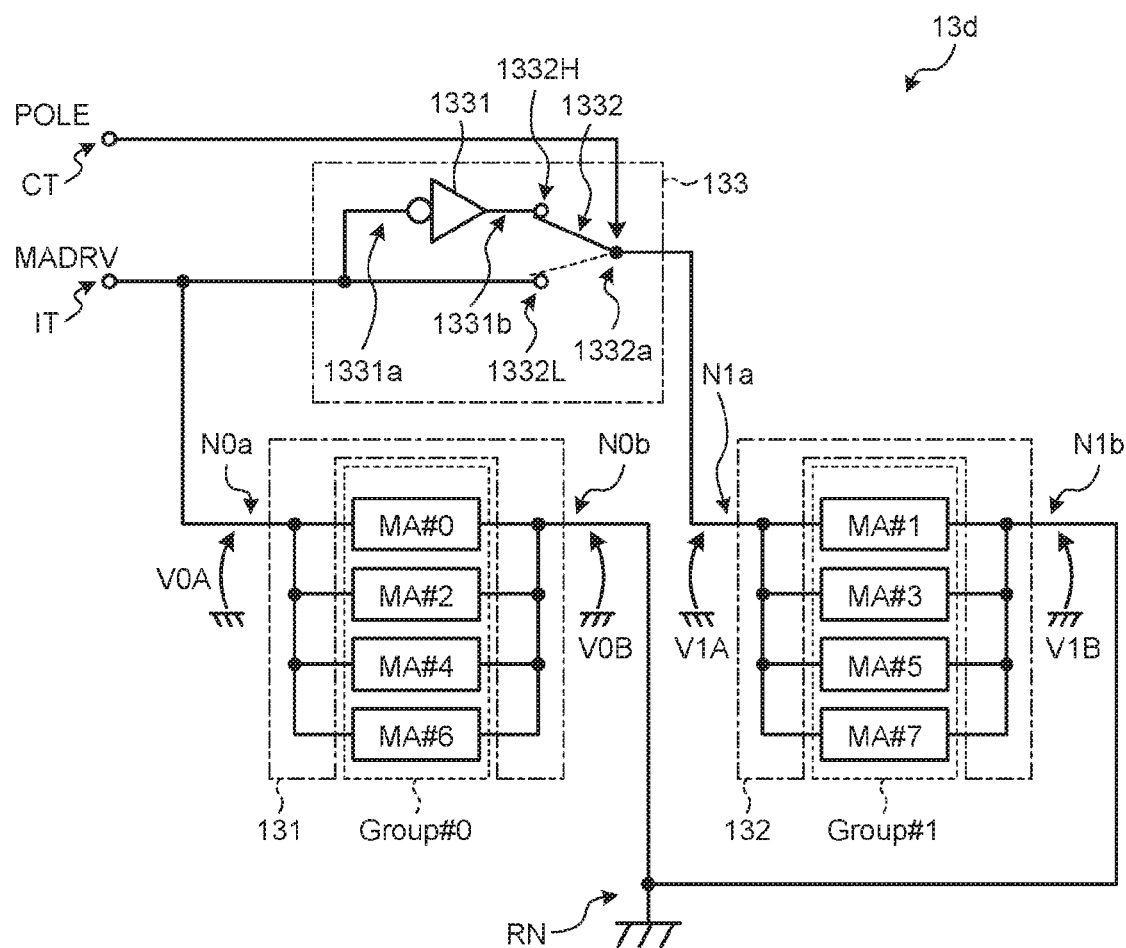
FIG. 5 is a circuit diagram showing a configuration of a fine movement control circuit in the first embodiment.

The fine movement control circuit 13d of the driver circuit 13 is configured as shown in, e.g., FIG. 5. FIG. 5 is a circuit diagram showing an example configuration of the fine movement control circuit 13d of the driver circuit 13. In the fine movement control circuit 13*d* shown in FIG. 5, the stretchable members MA#0 to MA#7 are divided into two groups Group#0, Group#1 according to the corresponding magnetic heads MH#0 to MH#7. Dividing into the groups Group#0, Group#1 is performed according to the orientations of the magnetic heads MH#0 to MH#7 with respect to the magnetic disks MD or the arms AM#0 to AM#4 (see FIG. 2). Group#0 includes even-numbered stretchable members MA#0, MA#2, MA#4, MA#6. The stretchable members MA#0, MA#2, MA#4, MA#6 function as movable elements in the fine movement actuators 7-0, 7-2, 7-4, 7-6 respectively. Group#1 includes odd-numbered stretchable members MA#1, MA#3, MA#5, MA#7. The stretchable members MA#1, MA#3, MA#5, MA#7 function as movable elements in the fine movement actuators 7-1, 7-3, 7-5, 7-7 respectively. In the fine movement control circuit 13*d*, the stretchable members MA included in each of Group#0 and Group#1 are wired so as to be driven in the same polarity.

The fine movement control circuit 13*d* has an input terminal (control signal input terminal) IT, a reference node RN, a driving circuit 131, a driving circuit 132, a switching circuit 133, and a control terminal (switching signal input terminal) CT. Note that the fine movement control circuit 13*d* does not include Group#0, Group#1, which are objects to be driven.

The fine movement control signal MADRV is input from the generating circuit 13*b* (see FIG. 1) to the input terminal IT. The input terminal IT is electrically connected to one end N0*a* of the driving circuit 131 and electrically connected to one end N1*a* of the driving circuit 132 via the switching circuit 133.

A reference voltage (e.g., GND voltage) is supplied from a reference voltage generating circuit (not shown) to the reference node RN. The reference node RN is electrically connected to the other end N0*b* of the driving circuit 131 and electrically connected to the other end N1*b* of the driving circuit 132.

The driving circuit 131 has Group#0 (a first object to be driven) inserted electrically between the one end N0*a* and the other end N0*b*. The one end N0*a* is connected in parallel to one ends of the stretchable members MA#0, MA#2, MA#4, MA#6 of Group#0. The other end N0*b* is connected in parallel to the other ends of the stretchable members MA#0, MA#2, MA#4, MA#6 of Group#0. Thus, the driving circuit 131 outputs a drive signal according to the fine movement control signal MADRV to each of the stretchable members MA#0, MA#2, MA#4, MA#6 of Group#0.

The driving circuit 132 has Group#1 (a second object to be driven) inserted electrically between the one end N1*a* and the other end N1*b*. The one end N1*a* is connected in parallel to one ends of the stretchable members MA#1, MA#3, MA#5, MA#7 of Group#1. The other end N1*b* is connected in parallel to the other ends of the stretchable members MA#1, MA#3, MA#5, MA#7 of Group#1. Thus, the driving circuit 132 outputs a drive signal according to a signal obtained by the fine movement control signal MADRV going through the switching circuit 133 to Group#1.

The switching circuit 133 is electrically connected between the input terminal IT and the driving circuit 132. The switching circuit 133 has an inverter 1331 and a switch 1332. The inverter 1331 is connected at its input node 1331*a* to the input terminal IT and connected at its output node 1331*b* to the switch 1332. The switch 1332 is electrically connected at its node 1332*a* to the one end N1*a* of the driving circuit 132, electrically connected at its node 1332H to the output node 1331*b* of the inverter 1331, and electrically connected at its node 1332L to the input terminal IT and the input node 1331*a* of the inverter 1331.

A switching signal POLE for controlling the operation of the switch 1332 is supplied from the controller 17 (see FIG. 1) to the control terminal CT. The controller 17 switches the switch 1332 with use of the switching signal POLE so that the driving direction of Group#11 is the same as or opposite to that of Group#0. The switch 1332 electrically connects the input terminal IT or the output node 1331*b* of the inverter 1331 selectively to the driving circuit 132 according to the switching signal POLE. Thus, the switching circuit 133 switches between the state where the inverter 1331 is inserted electrically between the input terminal IT and the driving circuit 132 and the state where the input terminal IT and the driving circuit 132 are electrically connected with the inverter 1331 being bypassed according to the switching signal POLE.

For example, when the switching signal POLE=L (low), the switch 1332 provides the node 1332L and the node 1332*a* connected (as indicated by a broken line in FIG. 5). Thus, the fine movement control signal MADRV is supplied to the one end N0*a* of the driving circuit 131 and the one end N1*a* of the driving circuit 132, so that Group#0 and Group#1 are driven in the same polarity. That is, the switching circuit 133 switches to the InPhase mode as shown in FIG. 6. The switching signal POLE being at the L level corresponds to the InPhase mode.

When the switching signal POLE=H (high), the switch 1332 provides the node 1332H and the node 1332*a* connected (as indicated by a solid line in FIG. 5). Thus, whereas the fine movement control signal MADRV is supplied to the one end N0*a* of the driving circuit 131, a fine movement control signal "−MADRV", into which the fine movement control signal MADRV is logically inverted, is supplied to the one end N1*a* of the driving circuit 132, so that Group#0 and Group#1 are driven in opposite polarities. That is, the switching circuit 133 switches to the Scissors mode as shown in FIG. 6. The switching signal POLE being at the H level corresponds to the Scissors mode. FIG. 6 is a state diagram showing an operation of the driver circuit 13 and shows that, when the magnetic head MH used in access processing is the outer magnetic head MH#0 or MH#7, the fine movement control signals of the same polarity are supplied to Group#0 and Group#1 and that, when the magnetic head MH used in access processing is the inner magnetic head MH#1 to MH#6, the fine movement control signals of opposite polarities are supplied to Group#0 and Group#1.

That is, the switching circuit 133 switches connection of the input terminal IT and the reference node RN to the driving circuits 131 and 132 according to the switching signal POLE from the controller 17 so as to switch the drive mode of Group#0 and Group#11 between the InPhase mode where they are driven in the same direction and the Scissors mode where they are driven in opposite directions. The switching circuit 133 switches the polarity of the voltage across the stretchable members MA of Group#1 between being the same as that of the voltage across the stretchable members MA of Group#0 and being opposite thereto, with the polarity of the voltage across the stretchable members MA of Group#0 being fixed.

For example, when the magnetic head MH to be used in access processing (recording/reproducing) to a magnetic disk MD is the outer magnetic head MH#0 or MH#7, the controller 17 provides the switching signal POLE low to make the voltage across the stretchable members MA of Group#0 and the voltage across the stretchable members MA of Group#1 be of the same polarity. Thus, when the outer magnetic head MH#0 or MH#7 is active, all the magnetic heads MH#0 to MH#7 are driven in the InPhase mode, and hence the excitation of the torsional mode of the arm AM#0 or AM#7 due to access processing can be suppressed.

Further, when the magnetic head MH to be used in access processing (recording/reproducing) to a magnetic disk MD is the inner magnetic head MH#1 to MH#6, the controller 17 provides the switching signal POLE high to make the voltage across the stretchable members MA of Group#0 and the voltage across the stretchable members MA of Group#1 be of opposite polarities. Thus, when the outer magnetic head MH#1 to MH#6 is active, all the magnetic heads MH#0 to MH#7 are driven in the Scissors mode, and hence the bending mode of the arm AM#1 to AM#6 due to access processing can be cancelled out.

As described above, in the first embodiment, the driver circuit 13 of the disk apparatus 100 is configured in such a way as to switch the drive mode of the fine movement actuators 7-0 to 7-7 between the InPhase mode where they are driven in the same direction and the Scissors mode where fine movement actuators adjacent along the Z direction are driven in opposite directions, depending on the magnetic head MH to be used in access processing. For example, if the outer magnetic head MH#0 or MH#7 is to be used in access processing, the driver circuit 13 switches the drive mode of the fine movement actuators 7-0 to 7-7 to the InPhase mode and, if the inner magnetic head MH#1 to MH#6 is to be used in access processing, switches the drive mode of the fine movement actuators 7-0 to 7-7 to the Scissors mode. Thus, when the outer magnetic head MH#0 or MH#7 is used in access processing, the excitation of the torsional mode of the arm AM#0 or AM#7 due to access processing can be suppressed, and, when the inner magnetic head MH#1 to MH#6 is used in access processing, the bending mode of the arm AM#1 to AM#6 due to access processing can be cancelled out. As a result, unnecessary vibration excitation can be suppressed, and the control band of control to position the magnetic head MH can be efficiently improved.

Further, in the first embodiment, the switching circuit 133 of the driver circuit 13 switches connection configuration of the input terminal IT and the reference node RN to the driving circuits 131 and 132 according to the switching signal POLE from the controller 17. The switching circuit 133 switches the connection configuration so that in the InPhase mode the voltage across the stretchable members MA of Group#0 and the voltage across the stretchable members MA of Group#1 are of the same polarity. The switching circuit 133 switches the connection configuration so that in the Scissors mode the voltage across the stretchable members MA of Group#0 and the voltage across the stretchable members MA of Group#1 are of opposite polarities. Thus, the drive mode of the fine movement actuators 7-0 to 7-7 can be switched between the InPhase mode where they are driven in the same direction and the Scissors mode where adjacent fine movement actuators are driven in opposite directions depending on the magnetic head MH to be used in access processing.

It should be noted that tactics may be implemented in timings when active magnetic heads MH (used in access processing) are switched and timings when the drive mode of the fine movement actuators 7-0 to 7-7 is switched.

For example, consider the case where the drive mode of the fine movement actuators 7-0 to 7-7 is switched synchronously with timings when active magnetic heads MH are switched. In this case, at timings when active magnetic heads MH are switched, the polarity of the fine movement control signal MADRV, which corresponds to the switched-to magnetic head MH, may be inverted. Thus, a reaction force on the arm AM from the fine movement actuator 7 corresponding to the switched-to magnetic head MH may be likely to rapidly change depending on the level of the fine movement control signal MADRV, so that accuracy in positioning at the transition may decrease.

Figure 7:
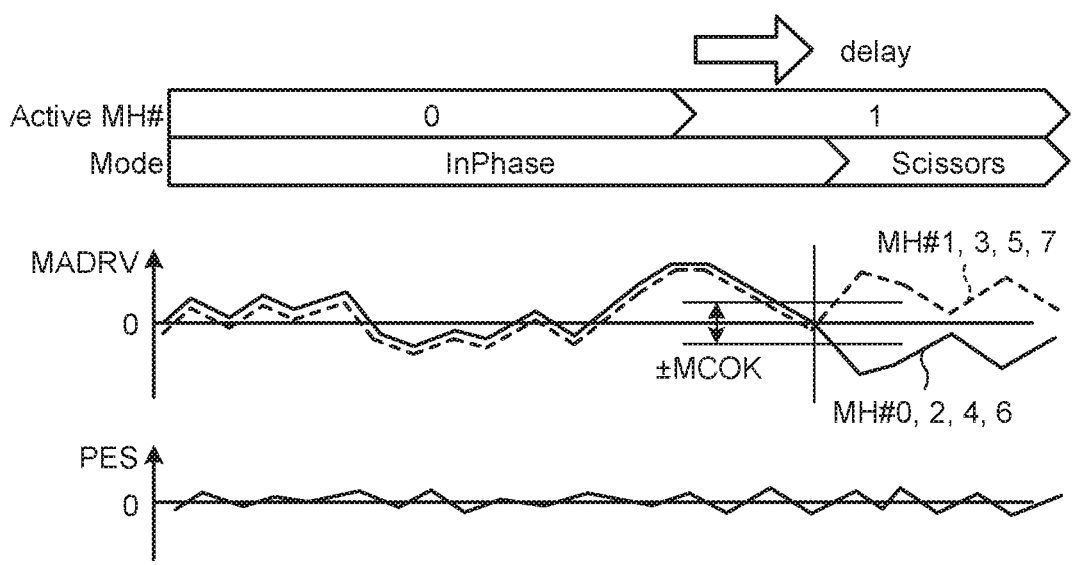
FIG. 7 is a waveform chart showing an operation of a driver in a modified example of the first embodiment.

Accordingly, as shown in FIG. 7, the controller 17 can control the driver circuit 13 to switch the mode at timings when the level of the fine movement control signal MADRV falls within a predetermined value range of −MCOK to +MCOK. FIG. 7 is a waveform chart showing an operation of the driver circuit 13. In FIG. 7, the horizontal axis represents time; two strips on the upper side indicate the number of the active magnetic head MH and the mode respectively; the vertical axis of the waveform chart in the middle represents the level of the fine movement control signal MADRV; and the vertical axis of the waveform chart on the lower side represents the level of a position deviation amount PES.

Figure 8:
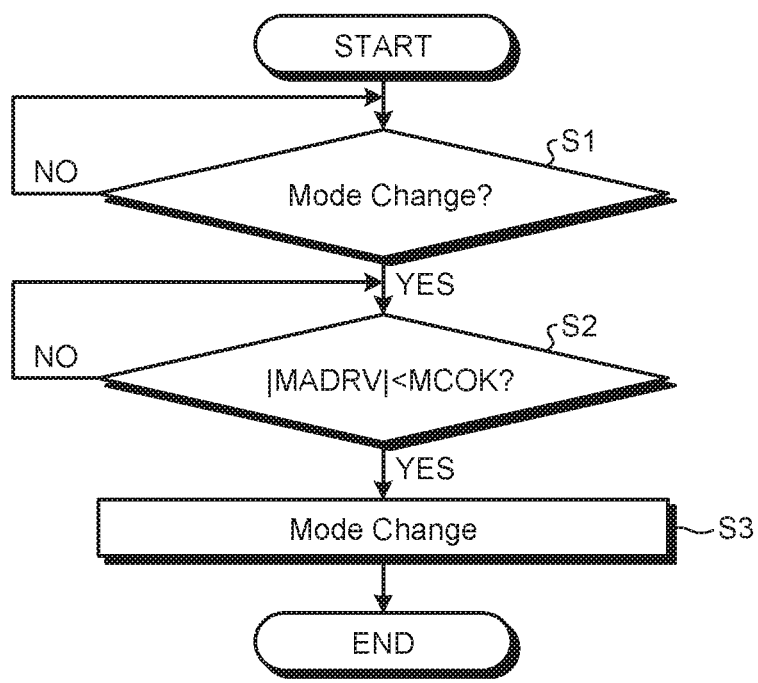
FIG. 8 is a flow chart showing an operation of the driver in the modified example of the first embodiment.

For example, as shown in FIG. 8, the controller 17 waits until a timing when active magnetic heads MH (used in access processing) are switched has come (while No at S1). When a timing at which active magnetic heads MH are switched has come, the controller 17 determines whether the level of the fine movement control signal MADRV is within the predetermined value range of −MCOK to +MCOK (S2) in order to change the mode (Yes at S1). Specifically, the controller 17 predicts the level of the fine movement control signal MADRV generated by the generating circuit 13b based on the control signal MACTR supplied to the generating circuit 13b. The controller 17 determines whether the predicted level of the fine movement control signal MADRV is within the threshold range of −MCOK to +MCOK at predetermined time intervals. The controller 17 waits until the level of the fine movement control signal MADRV falls within the threshold range of −MCOK to +MCOK (while No at S2). When the level of the fine movement control signal MADRV falls within the threshold range of −MCOK to +MCOK (Yes at S2), the controller 17 changes the level of the switching signal POLE (H to L or L to H) to control the driver circuit 13 to switch the mode (S3).

Or if the stabilizing time from the timing when active magnetic heads MH are switched to the timing when the level of the fine movement control signal MADRV falls within the predetermined value range of −MCOK to +MCOK can be found out experimentally beforehand, the controller 17 may control the driver circuit 13 to switch the mode at a timing delayed from the timing when magnetic heads MH are switched by time corresponding to the stabilizing time as indicated by the open arrow in FIG. 7.

As described above, because switching is performed after the absolute value of the level of the fine movement control signal MADRV becomes relatively small, variation in the fine movement control signal MADRV corresponding to the active magnetic head MH can be suppressed at mode switching, so that accuracy in positioning at the transition can be improved as shown by the waveform of the position deviation amount PES (see FIG. 7) calculated in the controller 17.

Second Embodiment

A disk apparatus according to the second embodiment will be described. Description will be made below focusing on the differences from the first embodiment.

In the first embodiment, the disk apparatus is configured such that the polarity of the voltage across the stretchable members MA of Group#1 is switched between being the same as that of the voltage across the stretchable members MA of Group#0 and being opposite thereto, with the polarity of the voltage across the stretchable members MA of Group#0 being fixed. That is, the driver circuit 13 (see FIG. 5) is configured such that, with the polarity of the fine movement control signal for one of the two, Group#0 and Group#1, being fixed, the polarity of the fine movement control signal for the other is switched. Hence, when active magnetic heads MH are switched, the polarity of the fine movement control signal MADRV, which corresponds to the switched-to magnetic head MH, may be inverted. Thus, a reaction force on the arm AM from the fine movement actuator 7 corresponding to the switched-to magnetic head MH is likely to rapidly change, so that accuracy in positioning at the transition may decrease.

In the second embodiment, instead of the driver circuit 13, the driver circuit 213 is configured such that each of the polarity of the voltage across the stretchable members MA of Group#0 and the polarity of the voltage across the stretchable members MA of Group#1 can be switched. That is, configuring the driver circuit 213 such that the polarities of the fine movement control signals for the two, Group#0 and Group#1, can be switched independently of each other, enables operation wherein, when active magnetic heads MH are switched, the polarity of the fine movement control signal MADRV, which corresponds to the switched-to magnetic head MH, is maintained to be the same as before the switching.

Figure 9:
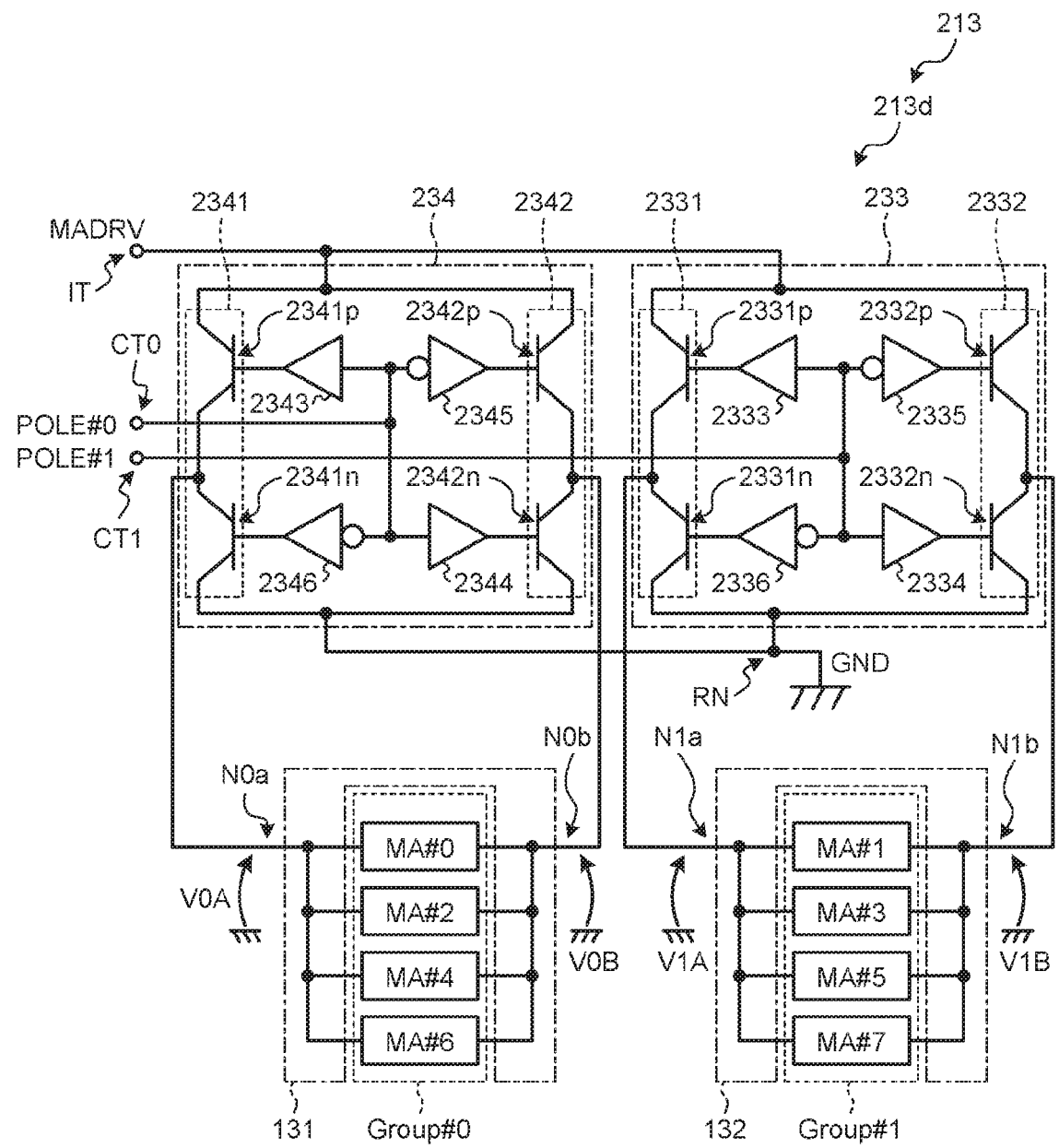
FIG. 9 is a circuit diagram showing a configuration of a fine movement control circuit in a second embodiment.

Specifically, the driver circuit 213 has a fine movement control circuit 213d shown in FIG. 9 instead of the fine movement control circuit 13d (see FIG. 5). In the fine movement control circuit 213d, opposite ends of the stretchable members MA of each of Group#0 and Group#1 are connected to an independent H bridge circuit, and the polarities can be switched according to the signal levels of the switching signals POLE#0 and POLE#1 respectively. FIG. 9 is a circuit diagram showing a configuration of a fine movement control circuit 213d of the driver circuit 213.

The fine movement control circuit 213d has a switching circuit 233, a switching circuit 234, a control terminal (switching signal input terminal) CT0, and a control terminal (switching signal input terminal) CT1 instead of the switching circuit 133 and the control terminal CT shown in FIG. 5.

The switching circuit 234 is electrically connected between the input terminal IT and the driving circuit 131. The switching circuit 234 has amplifiers 2343, 2344, inverters 2345, 2346, and switch groups 2341, 2342. The switch group 2341 has switches 2341p, 2341n. The switches 2341p, 2341n are, for example, NPN-type bipolar transistors. The amplifier 2343 and inverter 2346 are electrically connected between the control terminal CT0 and the control terminals (bipolar-transistor bases) of the switches 2341p, 2341n respectively. The switch group 2342 has switches 2342p, 2342n. The switches 2342p, 2342n are, for example, NPN-type bipolar transistors. The inverter 2345 and amplifier 2344 are electrically connected between the control terminal CT0 and the control terminals (bipolar-transistor bases) of the switches 2342p, 2342n respectively.

The switching circuit 233 is electrically connected between the input terminal IT and the driving circuit 132. The switching circuit 233 has amplifiers 2333, 2334, inverters 2335, 2336, and switch groups 2331, 2332. The switch group 2331 has switches 2331p, 2331n. The switches 2331p, 2331n are, for example, NPN-type bipolar transistors. The amplifier 2333 and inverter 2336 are electrically connected between the control terminal CT1 and the control terminals (bipolar-transistor bases) of the switches 2331p, 2331n respectively. The switch group 2332 has switches 2332p, 2332n. The switches 2332p, 2332n are, for example, NPN-type bipolar transistors. The inverter 2335 and amplifier 2334 are electrically connected between the control terminal CT1 and the control terminals (bipolar-transistor bases) of the switches 2332p, 2332n respectively.

A switching signal POLE#0 for controlling the operation of the switch groups 2341, 2342 is supplied from the controller 17 (see FIG. 1) to the control terminal CT0. The switching circuit 234 switches between the polarity (polarity "+") where the input terminal IT is electrically connected to one end N0a of the driving circuit 131 and where the reference node RN is electrically connected to the other end N0b of the driving circuit 131 and the polarity (polarity "−") where the reference node RN is electrically connected to one end N0a of the driving circuit 131 and where the input terminal IT is electrically connected to the other end N0b of the driving circuit 131 depending on the level of the switching signal POLE#0.

A switching signal POLE#1 for controlling the operation of the switch groups 2331, 2332 is supplied from the controller 17 (see FIG. 1) to the control terminal CT1. The switching circuit 233 switches between the polarity (polarity "+") where the input terminal IT is electrically connected to one end N1a of the driving circuit 132 and where the reference node RN is electrically connected to the other end N1b of the driving circuit 132 and the polarity (polarity "−") where the reference node RN is electrically connected to one end N1a of the driving circuit 132 and where the input terminal IT is electrically connected to the other end N1b of the driving circuit 132 depending on the level of the switching signal POLE#1.

Because the control as shown in FIG. 10 is possible, the controller 17 can control the driver circuit 213 such that, when active magnetic heads MH are switched, the polarity of the fine movement control signal MADRV, which corresponds to the switched-to magnetic head MH, is maintained to be the same as before the switching. FIG. 10 is a state diagram showing an operation of a driver circuit 213. FIG. 10 shows that, for each micro-actuator, each of the InPhase mode and the Scissors mode has two types of polarities (polarity "+" and polarity "−") available. Thus, degrees of freedom of mode-switching operation in the driver circuit 213 can be increased.

For example, when both the switching signals POLE#0, POLE#1 are high, the micro-actuators are driven in the InPhase mode in which the voltages V0A and V1A on terminals of the stretchable members MA belonging to Group#0 and Group#1 are at MADRV (polarity "+"). This condition is called state ST1. Because it is the InPhase mode, this state is selected when the outer magnetic head MH#0 or MH#7 becomes active. The combination of the switching signal POLE#0 being at the H level and the switching signal POLE#1 being at the H level corresponds to the InPhase mode.

When both the switching signals POLE#0, POLE#1 are low, the micro-actuators are driven in the InPhase mode in which the voltages V0B and V1B on terminals of the members MA belonging to Group#0 and Group#1 are at MADRV (polarity "−"). This condition is called state ST2. Because it is the InPhase mode, this state is selected when the outer magnetic head MH#0 or MH#7 becomes active. The combination of the switching signal POLE#0 being at the L level and the switching signal POLE#1 being at the L level corresponds to the InPhase mode.

When the switching signal POLE#0 is high and the switching signal POLE#1 is low, the micro-actuators are driven in the Scissors mode where the voltage on terminals of the members MA belonging to Group#0 takes on polarity "+" and where the voltage on terminals of the members MA belonging to Group#1 takes on polarity "−". This condition is called state ST3. Because it is the Scissors mode, this state is selected when the inner magnetic head MH#1 to MH#6 becomes active. The combination of the switching signal POLE#0 being at the H level and the switching signal POLE#1 being at the L level corresponds to the Scissors mode.

When the switching signal POLE#0 is low and the switching signal POLE#1 is high, the micro-actuators are driven in the Scissors mode where the voltage on terminals of the members MA belonging to Group#0 takes on polarity "−" and where the voltage on terminals of the members MA belonging to Group#1 takes on polarity "+". This condition is called state ST4. Because it is the Scissors mode, this state is selected when the inner magnetic head MH#1 to MH#6 becomes active. The combination of the switching signal POLE#0 being at the L level and the switching signal POLE#1 being at the H level corresponds to the Scissors mode.

Here, for example, consider the case where, when the active magnetic head MH is the magnetic head MH#0 with both the switching signals POLE#0, POLE#1 being high (that is, when in the state ST1), the active magnetic head MH is switched to the magnetic head MH#1 (the state ST3 or ST4 is selected). When in the state ST1, the voltage on a terminal of the stretchable member MA#1 corresponding to the magnetic head MH#1 takes polarity "+". In order to keep this condition, the state ST4, not ST3, needs to be selected. As such, if the active magnetic head is switched to the magnetic head MH#1 when in the state ST1, the state ST4 is selected.

FIG. 11 shows the state transition indicating the state to be selected next when the active magnetic head MH is switched, which is determined by the preceding state as above. FIG. 11 is a state transition diagram of the driver circuit 213. The vertical column "ACTIVE MH#" in FIG. 11 shows the number of the switched-to magnetic head, i.e., the next active magnetic head MH. The horizontal column beside "PREV. STATE" shows the number of the state before switched. The horizontal columns beside "STATE" show the number of the state after switched. The controller 17 appropriately selects for the levels of the switching signals POLE#0, POLE#1 according to this logical table and thereby can switch modes while maintaining the polarity of the fine movement control signal MADRV, which corresponds to the next active magnetic head MH, to be the same.

Figure 12:
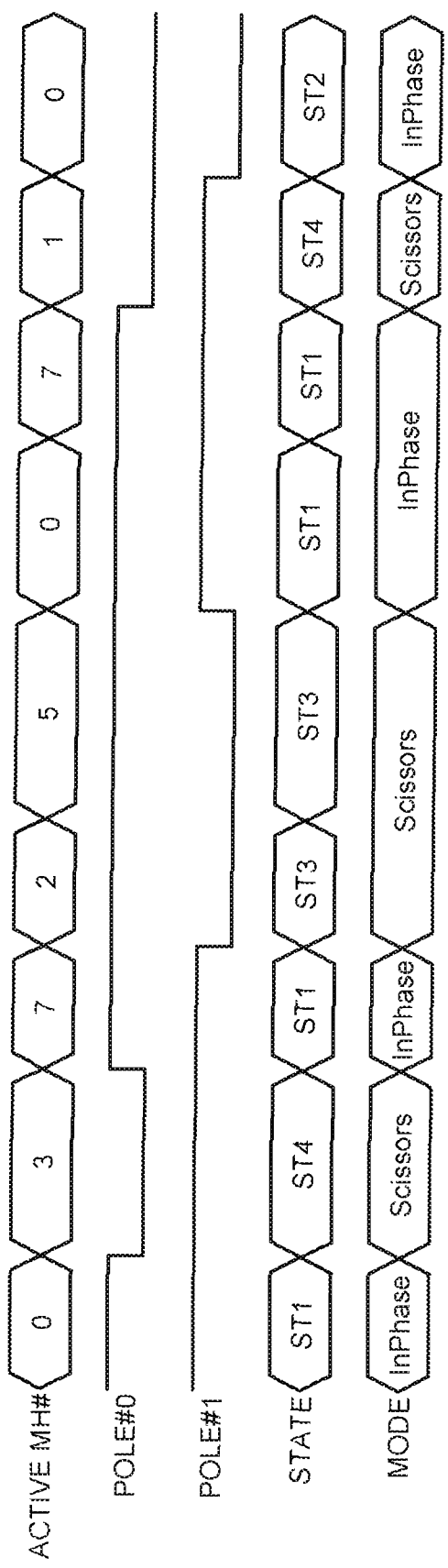
FIG. 12 is a waveform chart showing a control of a controller in the second embodiment.

For example, the controller 17 performs operation as shown in FIG. 12. FIG. 12 is a waveform chart showing example control by the controller 17. FIG. 12 is also a time chart showing example operation in the case where active magnetic heads MH are switched while the switching signals POLE#0, POLE#1 are set according to the state transition diagram of FIG. 11.

When the active magnetic head MH is the magnetic head MH#0 with both the switching signals POLE#0, POLE#1 being high (state ST1), the micro-actuators operate in the InPhase mode. Then if the active magnetic head MH is to be switched to the magnetic head MH#3, the state ST4, where the switching signal POLE#0=low and the switching signal POLE#1=high, is selected according to the state transition diagram shown in FIG. 11.

Figure 13:
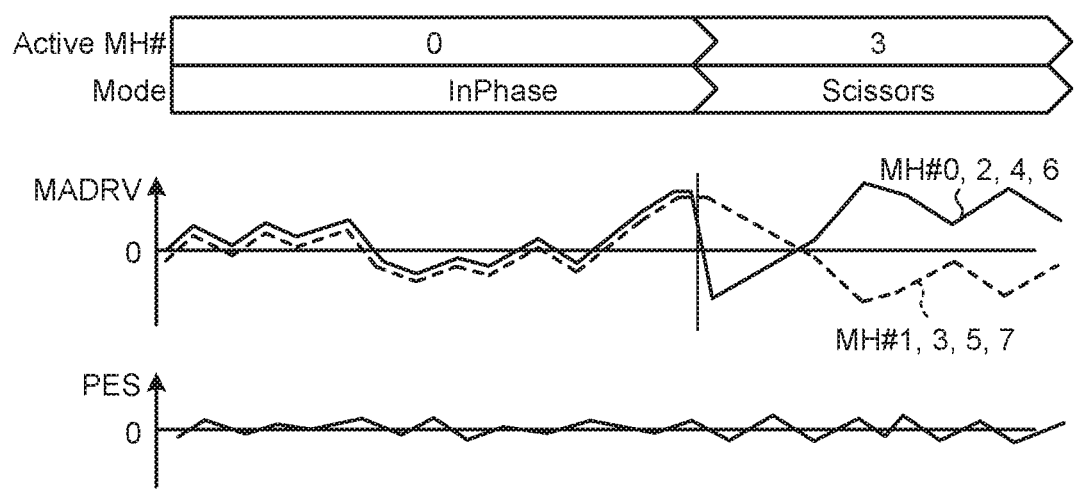
FIG. 13 is a waveform chart showing an operation of the driver in the second embodiment.

Thus, the mode is switched to the Scissors mode, but the polarity of the terminal voltage of the active magnetic head MH#3 is kept at polarity "+" as shown in FIG. 13. Then by appropriately setting the switching signals POLE#0, POLE#1 likewise, the mode can be switched between the InPhase mode and the Scissors mode while suppressing a reaction force on the carriage arm 6 and keeping the polarity of the terminal voltage of the stretchable member MA corresponding to the active magnetic head MH after switching. FIG. 13 is a waveform chart showing an operation of the driver circuit 213. In FIG. 13, the horizontal axis represents time; two strips on the upper side indicate the number of the active magnetic head MH and the mode respectively; the vertical axis of the waveform chart in the middle represents the level of the fine movement control signal MADRV; and the vertical axis of the waveform chart on the lower side represents the level of a position deviation amount PES. Although the polarity of the fine movement control signal MADRV supplied to the stretchable members MA#0, MA#2, MA#4, MA#6 corresponding to the magnetic heads MH#0, MH#2, MH#4, MH#6, which become non-active when switched, is inverted after switched as shown in the waveform chart of FIG. 13, if the influence of the inversion is negligible, there is seen no vibration in the waveform of the position deviation amount PES. If the influence of the inversion is not negligible, switching modes may be delayed from switching active heads as mentioned in the previously-described modified example of the first embodiment.

As described above, in the second embodiment, in the disk apparatus 100, when switching magnetic heads MH used in access processing, the controller 17 controls the driver circuit 213 in such a way as to switch the drive mode to the mode appropriate for the switched-to magnetic head MH from among the InPhase mode and the Scissors mode while maintaining the polarity of the drive signal, to be output to the fine movement actuator corresponding to the switched-to magnetic head, to be the same as before the switching. Thus, the inversion of the polarity of the fine movement control signal MADRV, which corresponds to the active magnetic head MH, at mode switching can be avoided, so that accuracy in positioning at the transition can be improved as shown by the waveform of the position deviation amount PES calculated in the controller 17 (see FIG. 13).

Further, in the second embodiment, in the driver circuit 213, the switching circuit 234 switches between the polarity (polarity "+") where the input terminal IT is electrically connected to one end N0$a$ of the driving circuit 131 and where the reference node RN is electrically connected to the other end N0$b$ of the driving circuit 131 and the polarity (polarity "−") where the reference node RN is electrically connected to one end N0$a$ of the driving circuit 131 and where the input terminal IT is electrically connected to the other end N0$b$ of the driving circuit 131 depending on the level of the switching signal POLE#0. The switching circuit 233 switches between the polarity (polarity "+") where the input terminal IT is electrically connected to one end N1$a$ of the driving circuit 132 and where the reference node RN is electrically connected to the other end N1$b$ of the driving circuit 132 and the polarity (polarity "−") where the reference node RN is electrically connected to one end N1$a$ of the driving circuit 132 and where the input terminal IT is electrically connected to the other end N1$b$ of the driving circuit 132 depending on the level of the switching signal POLE#1. That is, the polarity of connection of the driving circuit 131 to Group#0 and the polarity of connection of the driving circuit 132 to Group#1 can be switched independently of each other. Thus, when magnetic heads MH used in access processing are switched, the driver circuit 213 can be controlled in such a way as to switch the drive mode to the mode appropriate for the switched-to magnetic head MH from among the InPhase mode and the Scissors mode while maintaining the polarity of the drive signal, to be output to the fine movement actuator corresponding to the switched-to magnetic head, to be the same as before the switching.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus comprising:
   a coarse actuator having a first arm and a second arm;
   a first fine actuator supported by the first arm to move a first head relative to a first recording surface of a first disk;
   a second fine actuator placed adjacent to the first fine actuator along a direction substantially perpendicular to the first recording surface, the second fine actuator being supported by the second arm to move a second head relative to a second recording surface of the first disk;
   a third fine actuator placed adjacent to the second fine actuator and on an opposite side from the first fine actuator along the direction substantially perpendicular to the first recording surface, the third fine actuator being supported by the second arm to move a third head relative to a third recording surface of a second disk; and
   a driver circuit configured to be able to switch between a first mode and a second mode, the first mode being a mode where the driver circuit drives the first fine actuator, the second fine actuator, and the third fine actuator in a same direction with respect to the first arm and the second arm while driving the first arm and the second arm in a same direction, the second mode being a mode where the driver circuit drives the first fine actuator and the second fine actuator in opposite directions with respect to the first arm and the second arm and drives the third fine actuator and the second fine actuator in opposite directions with respect to the first arm and the second arm while driving the first arm and the second arm in a same direction.

2. The disk apparatus according to claim 1, wherein the driver circuit switches to the first mode or the second mode depending on which head of the first head, the second head, and the third head is to be used for accessing a recording surface.

3. The disk apparatus according to claim 1, wherein the driver circuit switches to the first mode if the first head is used for accessing the first recording surface, and switches to the second mode if the second head is used for accessing the second recording surface or if the third head is used for accessing the third recording surface.

4. The disk apparatus according to claim 1, wherein the driver circuit includes:
   a first signal input terminal to which a control signal is input; and
   a second signal input terminal to which a switching signal is input, the switching signal being a signal to instruct the driver circuit to switch to the first mode or the second mode.

5. The disk apparatus according to claim 1, wherein the first arm is an outermost arm in the coarse actuator.

6. The disk apparatus according to claim 1, further comprising
   a controller configured to switch heads to be used for accessing a recording surface and to control the driver circuit to switch to a mode appropriate for a head to be switched among the first mode and the second mode based on that an amplitude of a drive signal to be output by the driver circuit falls within a threshold range.

7. The disk apparatus according to claim 1, further comprising
   a controller configured to select, at a first timing, a head to be used in access processing to a recording surface and to control, at a second timing later than the first timing, the driver circuit to switch to the first mode or the second mode depending on the selected head.

8. The disk apparatus according to claim 1, wherein the driver circuit is configured to be able to switch polarities of drive signals to be output to the first, second, and third fine actuators between a first polarity and a second polarity opposite the first polarity.

9. The disk apparatus according to claim 1, further comprising
   a controller configured to control, when switching heads to be used in access processing to a recording surface, the driver circuit to switch to a mode appropriate for a head to be switched among the first mode and the second mode while maintaining a polarity of a drive signal to be output to the actuator corresponding to the head to be switched to be a same polarity as before the switching.

10. A driver circuit comprising:
    a first terminal to which a signal is input;
    a second terminal to which a first switching signal to set a polarity of a drive signal for one of a first object to be driven and a second object to be driven is input, the first object being supported by a first arm, the second object being supported by a second arm;
    a first driving circuit that outputs a drive signal according to the signal input to the first terminal to the first object;
    a second driving circuit that outputs a drive signal according to the signal input to the first terminal to the second object; and
    a switching circuit that switches between a first mode and a second mode according to the first switching signal, the first mode being a mode where the driver circuit drives the first object and the second object in a same direction with respect to the first arm and the second arm while driving the first arm and the second arm in a same direction, the second mode being a mode where the driver circuit drives the first object and the second object in opposite directions with respect to the first arm and the second arm while driving the first arm and the second arm in a same direction.

11. The driver circuit according to claim 10, wherein the switching circuit switches connection configuration of the first terminal and the first and second driving circuits between connection in the first mode where the first driving circuit is connected to the first terminal in a first polarity while the second driving circuit is connected to the first terminal in the first polarity, and connection in the second mode where the first driving circuit is connected to the first terminal in the first polarity while the second driving circuit is connected to the first terminal in a second polarity opposite the first polarity, or connection in the second mode where the first driving circuit is connected to the first terminal in the second polarity while the second driving circuit is connected to the first terminal in the first polarity.

12. The driver circuit according to claim 10, wherein
the first driving circuit has a first end electrically connected to the first terminal, and
the second driving circuit has a first end electrically connected to the switching circuit, and
wherein the switching circuit has:
an inverter of which an input node is electrically connected to the first terminal; and
a switch that electrically connects the first terminal or an output node of the inverter selectively to the first end of the second driving circuit according to the first switching signal that has a level corresponding to the first mode and a level corresponding to the second mode.

13. The driver circuit according to claim 10, further comprising
a third terminal to which a second switching signal to set the polarity of a drive signal for the other of the first object to be driven and the second object to be driven is input,
wherein the switching circuit switches between the first mode and the second mode according to a combination of the first switching signal and the second switching signal.

14. The driver circuit according to claim 13, wherein
a combination of a first level of the first switching signal and a first level of the second switching signal corresponds to the first mode,
a combination of a second level of the first switching signal and a second level of the second switching signal corresponds to the first mode,
a combination of the first level of the first switching signal and the second level of the second switching signal corresponds to the second mode, and
a combination of the second level of the first switching signal and the first level of the second switching signal corresponds to the second mode.

15. The driver circuit according to claim 13, wherein
the switching circuit has:
a first switching circuit corresponding to the first driving circuit; and
a second switching circuit corresponding to the second driving circuit,
the first switching circuit has:
a first switch group that connects the first terminal to a first end of the first driving circuit when the first switching signal is at a first level; and
a second switch group that connects the first terminal to a second end of the first driving circuit when the first switching signal is at a second level, and
the second switching circuit has:
a third switch group that connects the first terminal to a first end of the second driving circuit when the second switching signal is at the first level; and
a fourth switch group that connects the first terminal to a second end of the second driving circuit when the second switching signal is at the second level.

16. The driver circuit according to claim 15, wherein
the first switch group electrically disconnects the first terminal from the first end of the first driving circuit when the first switching signal is at the second level,
the second switch group electrically disconnects the first terminal from the second end of the first driving circuit when the first switching signal is at the first level,
the third switch group electrically disconnects the first terminal from the first end of the second driving circuit when the second switching signal is at the second level, and
the fourth switch group electrically disconnects the first terminal from the second end of the second driving circuit when the second switching signal is at the first level.

17. A control method in a disk apparatus which has a coarse actuator having a first and a second arms, a first fine actuator supported by the first arm to move a first head relative to a first recording surface of a first disk, a second fine actuator placed adjacent to the first fine actuator along a direction substantially perpendicular to the first recording surface and supported by the second arm to move a second head relative to a second recording surface of the first disk, and a third fine actuator placed adjacent to the second fine actuator and on an opposite side from the first fine actuator along the direction substantially perpendicular to the first recording surface and supported by the second arm to move a third head relative to a third recording surface of a second disk, the control method comprising:
switching to a first mode where the first fine actuator, the second fine actuator, and the third fine actuator are driven in a same direction with respect to the first arm and the second arm while the first arm and the second arm are driven in a same direction; and
switching to a second mode where the first fine actuator and the second fine actuator are driven in opposite directions with respect to the first arm and the second arm and the third fine actuator and the second fine actuator are driven in opposite directions with respect to the first arm and the second arm while the first arm and the second arm are driven in a same direction.

18. The control method according to claim 17, wherein
switching to the first mode includes switching to the first mode if the first head is used for accessing the first recording surface, and
switching to the second mode includes switching to the second mode if the second head is used for accessing the second recording surface, or the third head is used for accessing the third recording surface.

19. The control method according to claim 17, wherein
switching to the first mode includes:
switching the head used for accessing a recording surface to the first head; and
after switching to the first head, switching to the first mode, and
switching to the second mode includes:
switching the head used for accessing the recording surface to the second head or the third head; and
after switching to the second head or the third head, switching to the second mode.

20. The control method according to claim 17, wherein
switching to the first mode includes:
switching to driving the first, second, and third fine actuators in a first polarity; and
switching to driving the first, second, and third fine actuators in a second polarity opposite the first polarity, and switching to the second mode includes:
switching to driving the first and third fine actuators in the first polarity and driving the second fine actuator in the second polarity; and
switching to driving the first and third fine actuators in the second polarity and driving the second fine actuator in the first polarity.

* * * * *